United States Patent [19]

Margolis

[11] 4,385,989
[45] May 31, 1983

[54] FILTER ASSEMBLY AND CARTRIDGE THEREFOR

[75] Inventor: Jerry Margolis, Jackson Heights, N.Y.

[73] Assignee: Metaframe, Inc., Irvington, N.J.

[21] Appl. No.: 302,540

[22] Filed: Sep. 16, 1981

[51] Int. Cl.³ .............................................. C02F 1/74
[52] U.S. Cl. .................................... 210/169; 210/282; 210/416.2; 119/5
[58] Field of Search ............... 210/169, 282, 416.2; 119/5

[56] References Cited

U.S. PATENT DOCUMENTS

| | | | |
|---|---|---|---|
| 2,935,199 | 5/1960 | Willinger | 210/169 |
| 3,151,069 | 9/1964 | Halpert | 210/169 |
| 3,850,806 | 11/1974 | Cohen | 210/169 |

Primary Examiner—Charles N. Hart
Assistant Examiner—Sharon T. Cohen
Attorney, Agent, or Firm—Howard C. Miskin

[57] ABSTRACT

A novel filter assembly (10) and filter cartridge (12) therefor for use in an under-gravel filtration system in an aquarium tank (24). The filter assembly (10) includes an airlift tube (14), a filter cartridge (12) removably secured to the upper end of the airlift tube (14), and a tubular member (16) extending through the filter cartridge (12) and into the airlift tube (14). An aerator (18) disposed near the bottom of the airlift tube (14) is connected to the tubular member (16) by air tubing (19, 20). The top and bottom walls (48, 50) of the filter cartridge (12) are apertured (56, 58). When air is forced down the tubular member (16) and out the aerator (18), the rising air bubbles in the airlift tube (14) draw water up the airlift tube (14) and into the filter cartridge (12) through the openings (58) in the bottom wall (50), the water being returned to the aquarium tank (24) through the openings (56) in the top wall (48).

9 Claims, 5 Drawing Figures

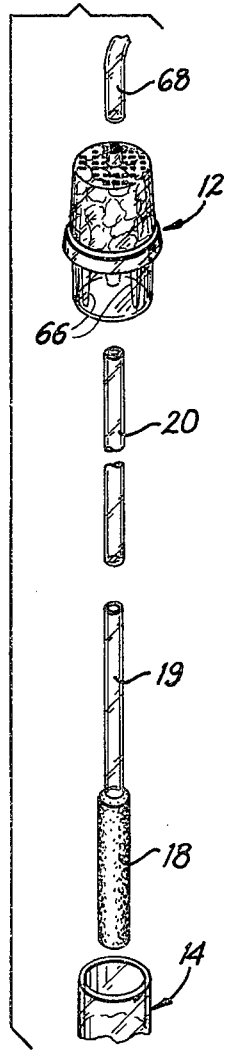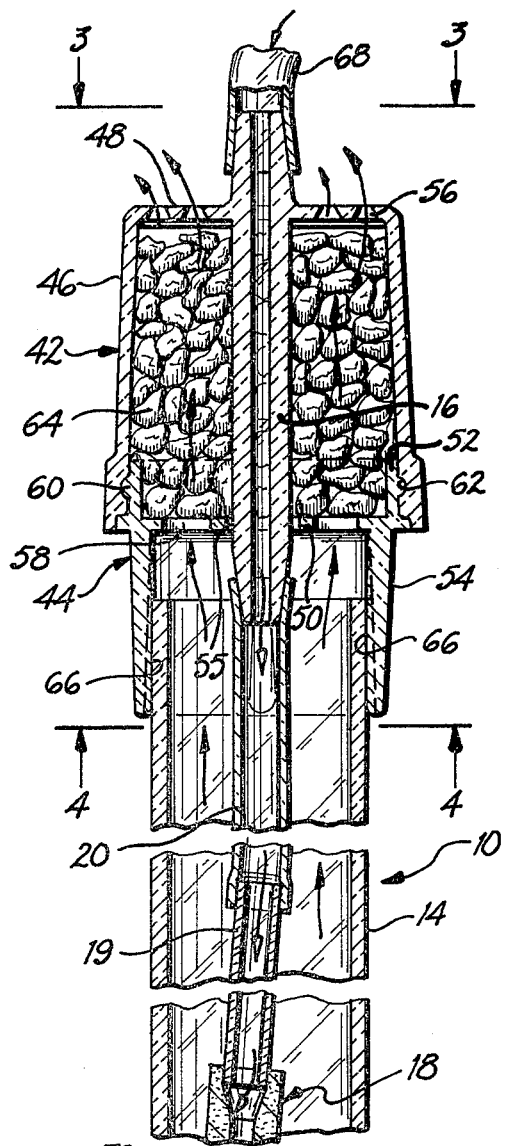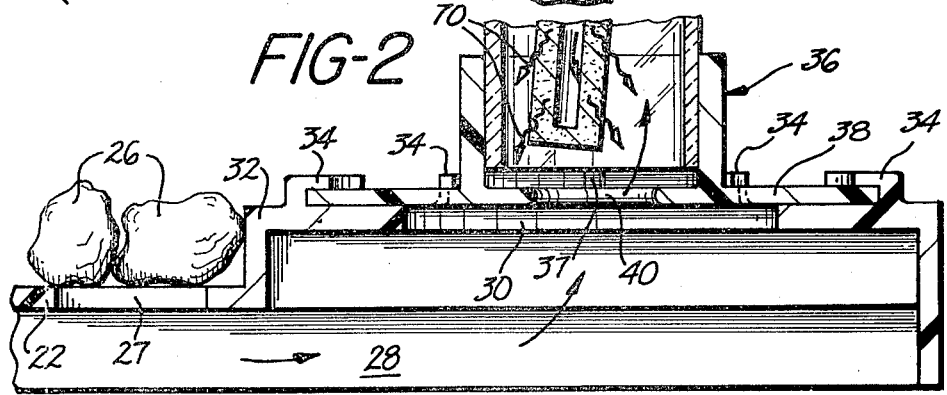

FILTER ASSEMBLY AND CARTRIDGE THEREFOR

TECHNICAL FIELD

This invention pertains to filter systems for aquarium tanks and the like, and more particularly to filter systems disposed inside the tank.

BACKGROUND ART

U.S. Pat. No. 2,935,199 issued to Willinger and owned by the assignee of this application, discloses an in-tank aquarium filtration system of the under-gravel variety. The system includes an apertured platform in spaced relation from the bottom of the aquarium tank for defining a space between the platform and the tank bottom. Gravel is distributed over the platform, the apertures in the platform being sufficiently small to prevent the gravel from falling therethrough. A hole is provided in one corner of the platform, and means are provided about the hole for securing a filter assembly. The filter assembly comprises two spaced apart tubular members connected at their lower ends to a housing defining a chamber for providing communication between the tubular members. A charcoal filled filter cartridge is disposed on the upper end of one tubular member, which serves as a lift tube, and an air supply is connected to the upper end of the other tubular member, which serves as an air tube.

When the filter assembly is secured on the platform above the hole therein, the hole establishes communication between the filter assembly and the space beneath the platform. Upon activation of the air supply, suction is established in the chamber at the bottom of the filter assembly. This suction draws aquarium water through the gravel bed into the space beneath the platform, and from there through the hole in the platform into the filter assembly. The water is then drawn up into the lift tube as the air bubbles from the air tube rise therein. Upon reaching the top of the lift tube, the water passes into the filter cartridge, which is apertured for this purpose. After passing through the cartridge, water is recirculated back into the aquarium via apertures in the top of the cartridge.

While the arrangement disclosed in the Willinger patent suits the intended purpose, the construction of the filter assembly comprising, as it does, two spaced apart tubes connected at their lower ends by a housing, is both cumbersome and space consuming. Another under-gravel filtration system of the type including a filter assembly comprising two spaced apart tubular members connected at their lower ends, is disclosed in U.S. Pat. No. 3,199,678. That patent is also issued to Willinger and owned by the assignee herein.

DISCLOSURE OF THE INVENTION

According to the present invention, I have developed a novel filter assembly for use with in-tank filtration systems of the under-gravel variety. The preferred novel filter assembly includes an airlift tube, and a novel filter cartridge, the latter comprising a cylindrical housing having apertured top and bottom walls, and a tubular member extending axially through the center of the housing. A tubular extension depending from the bottom wall of the cylindrical housing is dimensioned for a frictional sliding fit on the upper end of the airlift tube. The lower end of the airlift tube is securable above the usual hole in the under-gravel platform.

The lower end of the tubular member extending through the cartridge housing is connected to an aerator disposed at the bottom of the airlift tube above the hole in the under-gravel platform. The upper end of the tubular member is connected to an air pump or other suitable air supply. Activated charcoal or some other suitable filter medium is disposed in the housing about the tubular member.

When the air pump is activated, air flows through the tubular member extending through the cylindrical housing, and from there down into the aerator where it is dispersed in the form of air bubbles. As the air bubbles rise in the airlift tube, the resulting suction draws water down through the under-gravel platform, and from there through the hole in the platform communicating with the airlift tube. As the water rises in the airlift tube, it eventually reaches the apertured bottom of the filter cartridge, whereupon it passes into the filter cartridge for treatment by the activated charcoal therein. After passing through the charcoal, the water is discharged back into the aquarium tank via the apertures in the top wall of the cartridge.

It will therefore be apparent that the filter assembly of the present invention is significantly less complex than prior art arrangements, and also requires less space, as it avoids the necessity for two spaced apart tubular members.

Further features and advantages of the preferred filter assembly in accordance with the present invention will be more fully apparent from the following detailed description and annexed drawings of the presently preferred embodiment thereof.

BRIEF DESCRIPTION OF THE DRAWINGS

In the drawings:

FIG. 2 is a broken, vertical section of the preferred filter assembly;

FIG. 5 is an exploded perspective view of the preferred filter cartridge and associated tubing.

BEST MODE FOR CARRYING OUT THE INVENTION

Figure 1:
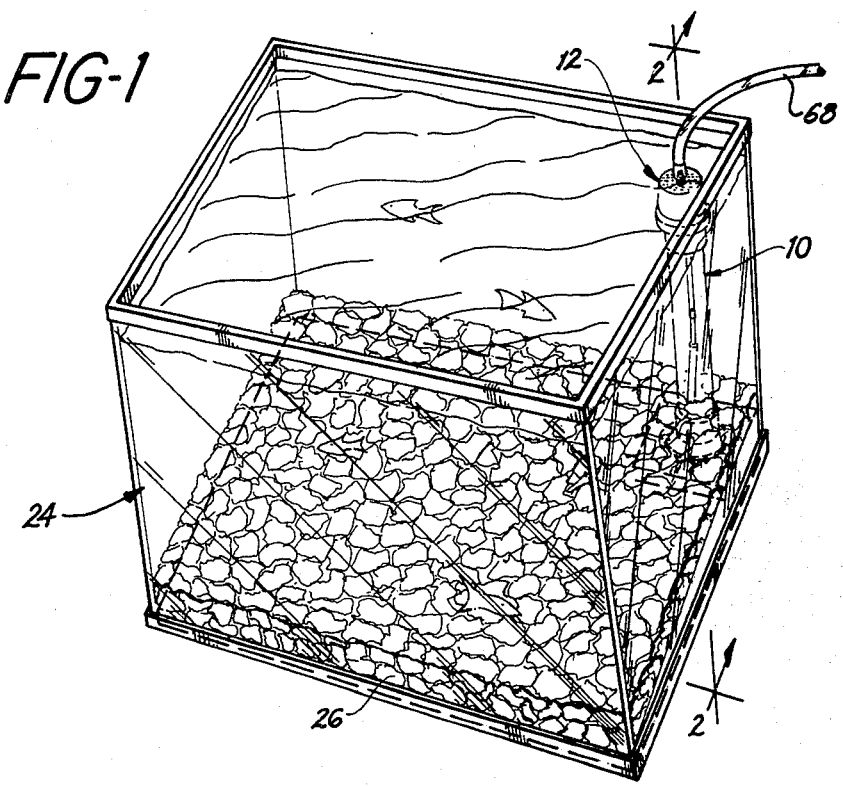
FIG. 1 is a perspective view, partly in phantom, showing the preferred filter assembly in use in an aquarium tank.

Referring now to the drawings, and initially to FIGS. 1, 2 and 5 thereof, the preferred filter assembly in accordance with the present invention is generally designated by the reference numeral 10. As shown, the preferred filter assembly 10 includes a filter cartridge 12 secured to the upper end of an airlift tube 14. A preferably integral tubular member 16 extends through the center of the cartridge 12 and communicates with an aerator 18 in the bottom of the airlift tube 14 via suitable air tubing 19, 20.

The filter assembly 10 is designed for use with an under-gravel filtration system of the type disclosed in U.S. Pat. Nos. 2,935,199 and 3,199,678, the contents of which are hereby incorporated herein by reference in their entireties. Referring to FIGS. 1 and 2, the undergravel filtration system includes a slotted platform 22 in spaced relation from the bottom of the aquarium tank 24. The platform 22 is preferably of the construction shown and described in U.S. Pat. No. 2,935,199. Gravel 26 or the like is distributed over the platform 22, the slots 27 in the platform being sufficiently small to prevent the gravel from passing therethrough into the space 28 beneath the platform 22.

The lower end of the airlift tube 14 is secured to the platform 22 in communication with a hole 30 in a raised section 32 of the platform. While any suitable means for securing the airlift tube 14 above the hole 30 will suffice, an arrangement similar to that disclosed in U.S. Pat. No. 2,935,199 is presently preferred. Thus, the upper surface of the section 32 is provided with a preferably discontinuous lip 34 extending about a portion of the hole 30, such that when viewed from the top, the lip 34 is preferably substantially U-shaped. An open-ended tubular support member 36 having a radial flange 38 is securable to the section 32 above the hole 30 by sliding the flange 38 under the lip 34. As best shown in FIG. 2, the support member 36 is dimensioned to receive the lower end of the airlift tube 14, which thereby communicates with the hole 30 via the open end 40 of the support member. The inside wall of the support member 36 is preferably provided with a plurality of ribs 37 to insure a secure friction fit between the member 36 and the airlift tube 14.

Figure 3:
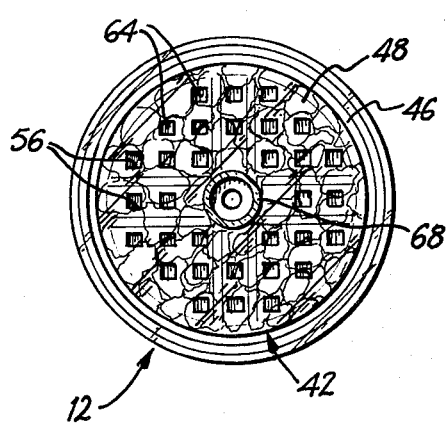
FIG. 3 is a sectional view taken substantially along the line 3—3 in FIG. 2 showing the top of the preferred filter cartridge employed in the preferred filter assembly.
Figure 4:
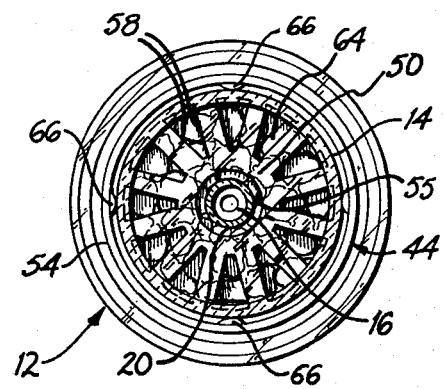
FIG. 4 is a view taken substantially along the lines 4—4 in FIG. 2, showing the bottom of the preferred filter cartridge.

The preferred filter cartridge 12 is substantially cylindrical and comprises an upper section 42 and a lower section 44. The upper section 42 is preferably integrally formed and includes side wall 46, top wall 48, and the concentric tubular member 16. The lower section 44 comprises bottom wall 50, an upwardly extending annular flange 52, and a depending cylindrical flange 54. As best shown in FIGS. 3 and 4, the top wall 48 is provided with a plurality of apertures 56, and bottom wall 50 is provided with a plurality of radially extending slots 58. The reason for this will be more fully apparent hereinafter. The bottom wall 50 is also provided with a centered hole 55 for receiving the lower end of the tubular member 16 when the cartridge 12 is assembled. The upper and lower sections 42, 44 of filter cartridge 12 are preferably releasably secured together by a snap fit established by a circumferentially extending rib 60 on the outer surface of flange 52, and a corresponding recess 62 on the inner surface of side wall 46. Activated bone charcoal 64 or the like is disposed about the tubular member 16 in the chamber defined by the cartridge 12.

The filter assembly 10 is preferably assembled by first disposing the lower end of the airlift tube 14 in the tubular support member 36, which is then secured to the raised section 32 of the platform 22 in the manner more fully described above. One end of the air tubing 20 is then slid over air tube 19 at the upper end of the aerator 18. The other end of the air tubing 20 is connected to the lower end of the tubular member 16. The aerator 18 is then fed down the airlift tube until the cartridge 12 is seated on the upper end of the airlift tube. As best shown in FIG. 2, the depending flange 54 on the lower section 44 of cartridge 12 is dimensioned for a friction fit with the upper end of the airlift tube 14 for releasably securing the cartridge 12 thereto. The inner surface of the flange 54 is preferably provided with a plurality of equally spaced axially extending ribs 66 to insure a secure friction fit with the tubular member 14.

As best shown in FIG. 1, the raised section 32 is in one corner of the platform 22 such that when the undergravel filtration system incorporating the filter assembly 10 is disposed in the tank 24, the filter assembly 10 occupies one corner of the tank. After the tank 24 is filled with water, the filter assembly 10 is rendered operative by connecting the upper end of the tubular member 16 to an air pump or other air supply source (not shown) via air tubing 68. The air pump forces air through the aerator 18 via tubular extension 16 and air tubing 19, 20. As diagrammatically illustrated by the arrows 70 in FIG. 2, the aerator 18 distributes the air in the form of bubbles in the bottom of the airlift tube 14. As the air bubbles rise in the airlift tube 14, they establish a suction which draws water through the gravel 26, the slots 27 in the platform 22, the space 28 beneath the platform 22, and from there up through the aligned holes 30 and 40 and into the airlift tube 14. As a result of this flow, waste material and debris in the water are drawn into the gravel bed. In a well known manner, the gravel bed serves to convert the waste into predominately gaseous non-toxic compounds, which are then drawn into the airlift tube 14 in the manner previously described. As water rises in the airlift tube 14, it eventually reaches the bottom wall 50 of the cartridge 12, whereupon it passes into the cartridge 12 through the radial slots 58. The activated charcoal 64 in the cartridge 12 serves as a degassing substance for the gaseous compounds. In the absence of degassing, these compounds would soon cloud the water in the aquarium tank 24.

After passing through the activated charcoal 64, clean water is returned to the aquarium tank 24 through the apertures 56 in the top wall 48 of the cartridge 12, which is preferably below the water level. The relatively small apertures 56 in the top wall 48 serve to break up the exiting air bubbles, thereby providing more effective aeration for the tank water.

The activated charcoal 64 in the cartridge 12 will require periodic replacement. This is easily accomplished by disconnecting the tubing 68, and then pulling the cartridge 12 off the upper end of the airlift tube 14. The cartridge may then be discarded, and a new cartridge substituted in its place. Alternatively, the cartridge 12 may be refilled by disconnecting the upper and lower sections 42, 44, emptying the activated charcoal 64, refilling the cartridge, and then snapping the two section back together. Thus refilled, the cartridge 12 is again ready for use.

While I have herein shown and described the presently preferred embodiment of the present invention and have suggested certain modifications thereto, it will be apparent to those skilled in the art that still further changes and modifications may be made therein without departing from the spirit and scope of the invention. Accordingly, the above description should be construed as illustrative, and not in a limiting sense, the scope of the invention being defined by the following claims.

I claim:

1. In a filter cartridge for a filter assembly of the type including an airlift tube, said filter cartridge being of the type comprising: a housing defining a chamber for a filter medium, said housing having top and bottom walls provided with openings, and a sidewall extending between said top and bottom walls; and means for releasably securing the cartridge to the airlift tube with the bottom wall of the cartridge disposed over the top of the airlift tube, the improvement comprising;

a tubular member carried by and extending through said housing, one end of said tubular member extending through said bottom wall of said cartridge for connection to an aerator disposed in said airlift tube, the other end of said tubular member protruding from said housing and being adapted for operative connection to air supply means whereby air flow to said aerator is accommodated through said filter cartridge via said tubular member.

2. The filter cartridge according to claim 1, where said housing is of substantially cylindrical shape, and wherein said tubular member extends substantially along the axis of said housing and said other end of said tubular member extends through said top wall.

3. The filter cartridge according to claim 1 or 2, wherein said cartridge comprises an upper section including said top wall and said sidewall, and a lower section including said bottom wall, said tubular member being integrally formed with said upper section, said bottom wall having a through hole therein for receiving said one end of said tubular member, and further comprising means for releasably securing said upper and lower sections together, whereby said cartridge is optionally refillable.

4. The filter cartridge according to claim 3, wherein said means for releasably securing said upper and lower cartridge sections comprises a recess in the inner surface of said sidewall, and an externally ribbed flange extending upwardly from said bottom wall, said rib being dimensioned for a snap fit in said recess; and wherein said means for releasably securing the cartridge to the airlift tube comprises a cylindrical flange depending from said bottom wall and dimensioned for a frictional telescoping fit with the upper end of the airlift tube.

5. A filter assembly for use with an under-gravel filter platform, said assembly being of the type including an airlift tube securable at its lower end to said platform, and a filter cartridge of the type comprising: a housing defining a chamber for a filter medium, said housing having top and bottom walls provided with openings, and a sidewall extending between said top and bottom walls; and means for releasably securing the cartridge to the airlift tube with the bottom wall of the cartridge disposed over the top of the airlift tube, the improvement comprising:

a tubular member carried by and extending through said housing, one end of said tubular member extending through said bottom wall of said cartridge, the other end of said tubular member protruding from said housing and being adapted for operative connection to air supply means;

an aerator disposed in said airlift tube; and air tubing connected at one end to said aerator and at the other end to said one end of said tubular member, whereby air flow to said aerator is accommodated through said filter cartridge via said tubular member and said air tubing.

6. The filter assembly according to claim 5, wherein said housing is of substantially cylindrical shape, and wherein said tubular member extends substantially along the axis of said housing and said other end of said tubular member extends through said top wall.

7. The filter cartridge according to claim 5, wherein said cartridge comprises an upper section including said top wall and said sidewall, and a lower section including said bottom wall, said tubular member being integrally formed with said upper section, said bottom wall having a through hole therein for receiving said one end of said tubular member, and further comprising means for releasably securing said upper and lower sections together, whereby said cartridge is optionally refillable.

8. The filter assembly according to claim 7, wherein said means for releasably securing said upper and lower cartridge sections comprises a recess in the inner surface of said sidewall, and an externally ribbed flange extending upwardly from said bottom wall, said rib being dimensioned for a snap fit in said recess; and wherein said means for releasably securing the cartridge to the airlift tube comprises a cylindrical flange depending from said bottom wall and dimensioned for a frictional telescoping fit with the upper end of the airlift tube.

9. The filter assembly according to claim 5, wherein said aerator is disposed substantially at the bottom of said airlift tube.

* * * * *